(12) United States Patent
Berger

(10) Patent No.: US 9,001,850 B2
(45) Date of Patent: Apr. 7, 2015

(54) EXCITATION UNIT FOR A FIBER LASER

(76) Inventor: Roland Berger, Eggstatt (DE)

( * ) Notice: Subject to any disclaimer, the term of this patent is extended or adjusted under 35 U.S.C. 154(b) by 0 days.

(21) Appl. No.: 14/118,997

(22) PCT Filed: Jun. 4, 2012

(86) PCT No.: PCT/EP2012/002395
§ 371 (c)(1),
(2), (4) Date: Nov. 20, 2013

(87) PCT Pub. No.: WO2012/167918
PCT Pub. Date: Dec. 13, 2012

(65) Prior Publication Data
US 2014/0112358 A1     Apr. 24, 2014

(30) Foreign Application Priority Data

Jun. 4, 2011 (DE) .......................... 10 2011 103 286

(51) Int. Cl.
| H01S 3/30 | (2006.01) |
|---|---|
| H01S 3/0941 | (2006.01) |
| H01S 3/067 | (2006.01) |
| H01S 3/094 | (2006.01) |

(Continued)

(52) U.S. Cl.
CPC .......... *H01S 3/0941* (2013.01); *H01S 3/06704* (2013.01); *H01S 3/094015* (2013.01); *H01S 3/0404* (2013.01); *H01S 3/0407* (2013.01); *H01S 3/042* (2013.01); *H01S 3/094019* (2013.01); *H01S 3/09408* (2013.01); *H01S 3/09415* (2013.01); *H01S 3/094007* (2013.01)

(58) Field of Classification Search
CPC .............. H01S 3/04; H01S 3/067; H01S 3/07

USPC ................................................... 372/6, 38.06
See application file for complete search history.

(56) References Cited

U.S. PATENT DOCUMENTS

| 4,537,193 A * | 8/1985 | Tanner ............................. 606/4 |
| 5,222,172 A * | 6/1993 | Suzuki ........................... 385/96 |
| 5,245,624 A * | 9/1993 | Toepel ........................... 372/72 |

(Continued)

FOREIGN PATENT DOCUMENTS

| JP | 2002076477 A | 3/2002 |
| JP | 2002270925 A | 9/2002 |

(Continued)

*Primary Examiner* — Colleen A Matthews
*Assistant Examiner* — Vu A Vu
(74) *Attorney, Agent, or Firm* — Robert Curcio; DeLio, Peterson & Curcio, LLC

(57) ABSTRACT

An excitation unit for a fiber laser having an excitation fiber and forming a two-dimensional or three-dimensional structure in a resonator region of the fiber laser. In cross-section, the excitation fiber has an active fiber core, a pump cladding that surrounds the active core, a quartz glass casing that surrounds the pump cladding, and at least one cover. The resonator region is equipped with a base plate having a plurality of excitation housings, each housing delimiting a gastight excitation chamber. The excitation fiber runs through each excitation chamber and is held in holding units. The excitation chambers are formed in an elliptical manner. The excitation housings are provided with a translucent window, and a transversal pump light source is arranged in the region of each translucent window such that a pump light that leaves the pump light source impinges the longitudinal axis of the excitation fiber in a perpendicular manner.

26 Claims, 7 Drawing Sheets

(51) Int. Cl.
*H01S 3/04* (2006.01)
*H01S 3/042* (2006.01)

(56) References Cited

U.S. PATENT DOCUMENTS 5,351,251 A * 9/1994 Hodgson ................ 372/4
7,221,840 B2 5/2007 Vienne et al.
7,813,390 B2 * 10/2010 Luo et al. ................ 372/32
2005/0220429 A1 10/2005 Davis
2009/0225793 A1 * 9/2009 Marciante et al. ........... 372/6

FOREIGN PATENT DOCUMENTS

JP 2005340742 * 8/2005 ........... H01S 3/094
JP 2005340742 A 12/2005

* cited by examiner

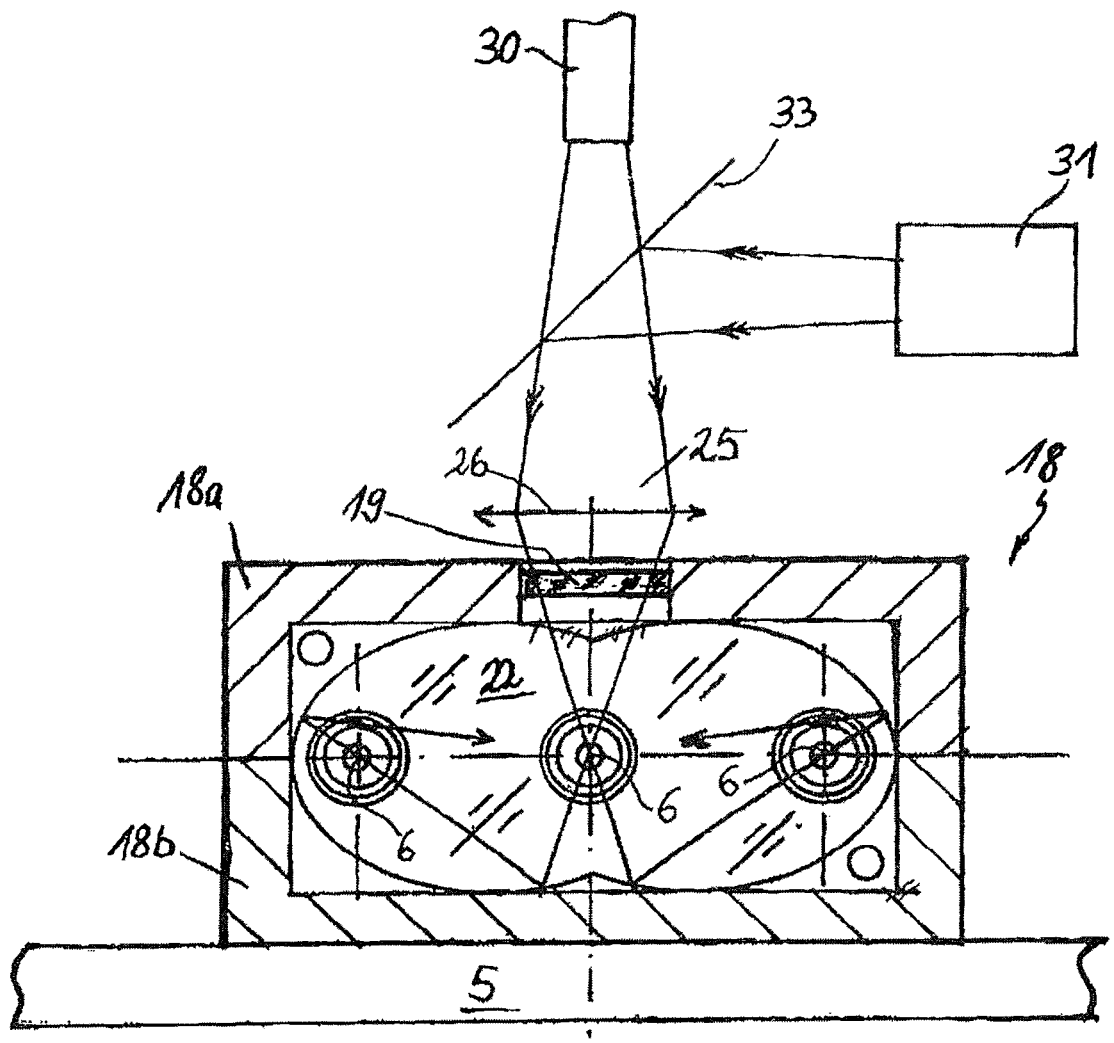
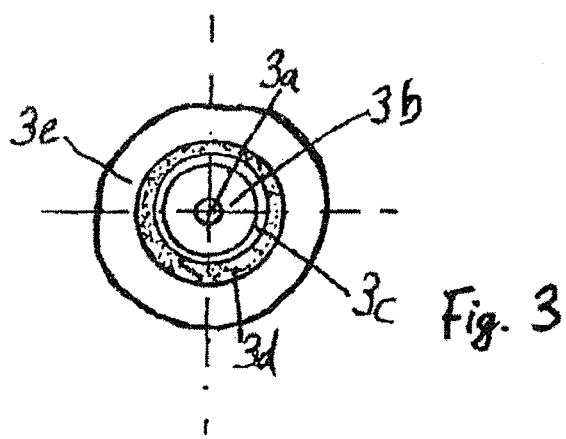

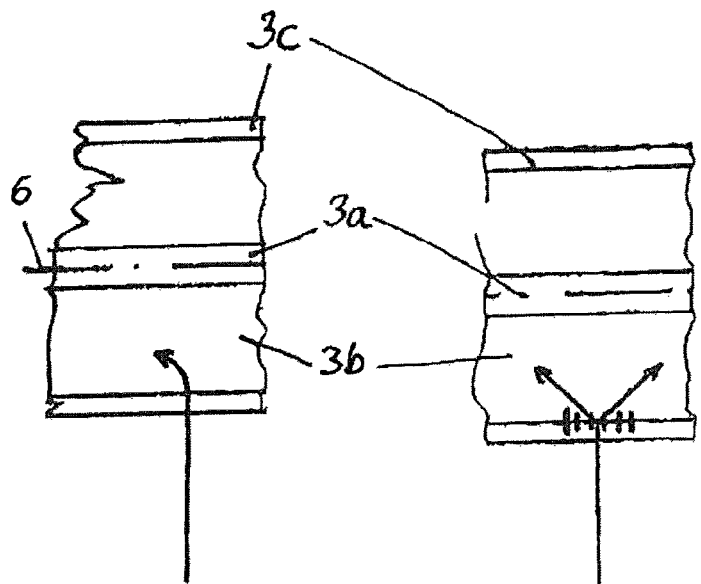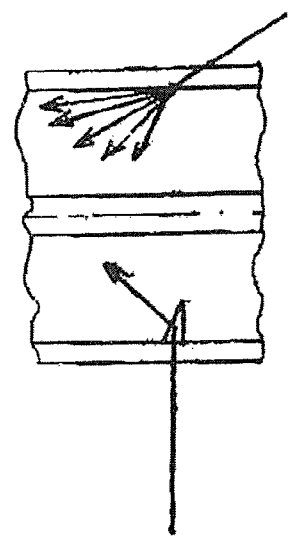
Fig. 7a    Fig. 7b    Fig. 7c
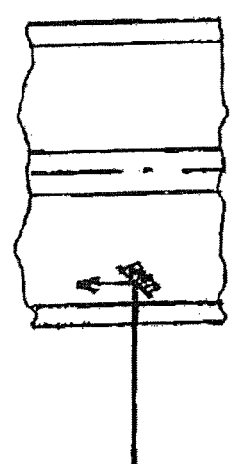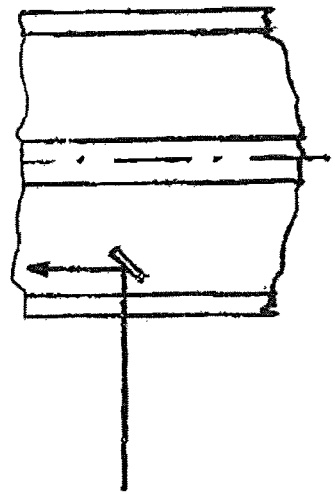
Fig. 7d    Fig. 7e

EXCITATION UNIT FOR A FIBER LASER

BACKGROUND OF THE INVENTION

1. Field of the Invention

The present invention relates to an excitation unit for a fiber laser.

2. Description of Related Art

Fiber lasers are a special form of solid state laser. Put simply, a fiber laser, more precisely the resonator of a fiber laser, consists of a glass fiber which has a doped core and a cladding. The doped core of the glass fiber thereby forms the active medium. It is thus a solid state laser with optical waveguide properties. Due to the relatively great length (high aspect ratio) of the fiber laser, the pump light, which is fed into the resonator of the fiber laser through a pump optic, causes an excitation of the active medium.

Fiber lasers are optically pumped in that rays, for example from diode lasers, are coupled in, usually coaxially to the fiber core, into its cladding, or into the core itself. Double clad fibers permit a higher power to be achieved; from the innermost of the two claddings, the pump beam reaches the active fiber core. In most cases, the power of a plurality of diode lasers is combined during the pumping process. Within the technical field, such a device has come to be referred to as a "combiner". A combiner is a pump module in which several fibers, through each of which the light of a diode laser passes, are spliced onto an excitation fiber.

A further possibility for realizing a pump module consists of an arrangement in which a plurality of laser diodes is so arranged that their output beams are parallel to one another and lie in the same plane. This adjacent arrangement of laser diodes creates a so-called laser bar. If several laser bars are stacked on top of one another, this creates a laser stack.

A fiber laser essentially consists, for example, of one or more pump laser diodes, an input coupling optic (fiber-coupled diode laser, separate or spliced to the cladding) and a resonator. The term "excitation unit", as used in this description, comprises one or more pump light sources (for example laser diodes in the form of a combiner or the aforementioned laser bars) and the optical and mechanical components which are necessary in order to couple the pump light into the active fiber.

The resonator can be structured in different ways: either it consists of two additional mirrors, which can for example be the two mirrored fiber end surfaces; an arrangement of lens and normal laser mirrors in the reflector and/or output coupling region is also possible. Often, Bragg gratings (also: FBGs=fiber Bragg gratings) are also provided which are inscribed in the waveguide by means of ultraviolet radiation (for example by a 248 nm excimer laser). This leads to lateral differences in the refractive index within the fiber core, with regions with high and low refractive indices which reflect rays of a particular wavelength depending on the period length. The advantage of this is that no additional coupling losses occur on these gratings in a monomode or single-mode fiber and the Bragg gratings only reflect the desired wavelengths selectively. This makes possible an extremely narrow-band operation of the laser. Multimode fibers >20 μm lead to more modes which contain a wider bandwidth of rays. The wavelength range can be reduced by means of external mirrors.

After exiting the active fiber, the laser beam passes into a transport fiber or into a fiber optic cable containing such a fiber. This process takes place with high efficiency, because there are virtually no coupling losses. The rays are, for example, passed via the fiber optic cable to the focusing optics of a laser material processing machine.

A fiber laser also contains the power supply and cooling for the pump laser diodes, as well as other heat-dissipating devices.

Sometimes, high performance fiber lasers possess, in addition, a small fiber laser or a powerful laser diode, which are referred to as seed lasers and which serve to generate the input power for a downstream fiber amplifier (optically pumped active fiber). The division of the laser into seed laser and post-amplification has the advantage that the laser activity can be better controlled. This applies to the wavelength stability, the beam quality and the power stability or pulseability. Usually there is an optical insulator between the seed laser and amplifier fiber.

Depending on the diameter of the fiber core, the laser beam emitted from the core (for example na=0.06) has, for example, a total angle of approximately 5°-10° (na—0.05-0.1). The beam quality is high; the mode of the beam is generally a TEM00 mode, a so-called monomode or single mode, preferred by laser manufacturers and in industry due to its good properties for welding, cutting, drilling, etc.

DE 26 46 692 A1 shows a liquid laser with excitation light sources 5, 6 in the form of flash lamps which are each housed in an elliptical chamber. Between the two elliptical chambers there are two focusing lenses 15, 16 which hold an optical resonator 4 between them. The resonator 4 is pumped by means of the excitation light sources, i.e., the pump light runs from the excitation light sources located in the excitation chambers to the resonator.

DE 198 33 166 A1 describes a pump light input arrangement for laser active fibers. Such a laser active fiber is illustrated in FIGS. 1*a* and 1*b* of this document: it is accommodated spirally within a tubular volume, laser diodes 13 project the pump light perpendicularly onto the fiber, which is in the form of a complete fiber with sheathing. The efficiency of the light in-coupling is likely to be extremely poor in this case due to the presence of the sheathing of the laser active fiber. There is no focusing lens between the laser diodes and the fiber.

DE 39 43 722 C2 shows a conventional in-coupling of a pump light into a laser medium 2. By way of example, examples are shown in FIGS. 1*a* to 1*c* in which a pump light 42 is directed from a laser diode 41 onto the surface of the laser medium 2. The laser diodes are oriented perpendicularly to the laser medium, the light guide devices always extending in such a way that the pump light enters the laser medium at an acute angle to this. The point at which in-coupling takes place is frequently referred to as the splice point.

SUMMARY OF THE INVENTION

Bearing in mind the problems and deficiencies of the prior art, it is therefore an object of the present invention to improve a fiber laser such that it displays an acceptable degree of efficiency on perpendicular radiation of a pump light and such that an intermediate fiber coupling for pumping can be dispensed with. In other words, the pump light should not enter into the active fiber of the fiber laser by means of an additional fiber. This problem is solved through an apparatus with the features specified in herein. Further advantageous embodiments are described in the claims.

The above and other objects, which will be apparent to those skilled in the art, are achieved in the present invention which is directed to an excitation unit for a fiber laser, the excitation unit comprising: at least one excitation fiber which has a longitudinal axis and which forms a two-dimensional or three-dimensional structure in a resonator region of the fiber laser, the excitation fiber, when viewed in cross-section, including an active fiber core, a pump cladding that surrounds the active core, a quartz glass casing that surrounds the pump cladding, a silicon buffer that surrounds the quartz glass casing and a cover; and the resonator region being equipped with a base plate on which a plurality of excitation housings are provided, each forming a gas-tight excitation chamber, the excitation fiber running through each excitation chamber at least once and being held in holding units laterally to each excitation chamber when viewed in the longitudinal axis of the excitation fiber, the cover of the excitation fiber being removed in the excitation chambers and being completely present in the regions of the holding units, the excitation fiber having a first fiber end which serves as a reflector element, and a second fiber end which serves as an out-coupling mirror element, wherein a) the excitation chambers are elliptically formed in a cross-section perpendicular to the longitudinal axis of the excitation fiber, b) the excitation housings are provided with a translucent housing window, and c) a transverse pump light source is arranged in the region of each translucent housing window such that a pump beam that leaves the pump light source impinges onto the longitudinal axis of the excitation fiber preferably in a perpendicular manner.

The excitation fiber runs through each excitation chamber at least two times.

The excitation chambers include a gas flushed therethrough. The excitation housings include a cooling medium flushed therethrough. The excitation housings may include two housing sections.

The elliptically formed excitation chambers include elliptical curved surfaces having focal lines. The focal lines of the elliptical curved surfaces may run parallel to one another.

The longitudinal axis of the excitation fiber within the excitation chambers coincide with the focal lines of the elliptical curved surfaces.

The excitation unit may include a focusing lens provided between the transverse pump light source and the excitation fiber. The focusing lens or the transverse pump light source or both may be adjustable.

The transverse pump light source may comprise laser bars, laser diodes, diode lasers, other laser light sources, seed lasers, or laser stacks, or any combination thereof.

Several excitation housings may be combined to form a larger continuous excitation housing.

The excitation unit may include an in-coupling unit on the first fiber end of the excitation fiber and an out-coupling unit on the second fiber end of the excitation fiber.

A longitudinal pump light source or a seed laser or both may be provided in the region of the first fiber end or in the region of the second fiber end or in both regions of the first fiber end and the second fiber end.

The longitudinal pump light source may comprise laser bars, laser diodes, diode lasers, other laser light sources, or seed lasers, or any combination thereof.

The excitation fiber may be arranged with opposing directions of curvature.

The transverse pump beam may be coupled into the pump cladding of the excitation fiber over a small surface area by an inhomogeneous gradient, diffraction, refraction, mirrors, or total reflection.

In a second aspect, the present invention is directed to a fiber laser including an excitation unit, the excitation unit comprising: at least one excitation fiber which has a longitudinal axis and which forms a two-dimensional or three-dimensional structure in a resonator region of the fiber laser, the excitation fiber, when viewed in cross-section, including an active fiber core, a pump cladding that surrounds the active core, a quartz glass casing that surrounds the pump cladding, a silicon buffer that surrounds the quartz glass casing and a cover; and the resonator region being equipped with a base plate on which a plurality of excitation housings are provided, each forming a gas-tight excitation chamber, the excitation fiber running through each excitation chamber at least once and being held in holding units laterally to each excitation chamber when viewed in the longitudinal axis of the excitation fiber, the cover of the excitation fiber being removed in the excitation chambers and being completely present in the regions of the holding units, the excitation fiber having a first fiber end which serves as a reflector element, and a second fiber end which serves as an out-coupling mirror element, wherein a) the excitation chambers are elliptically formed in a cross-section perpendicular to the longitudinal axis of the excitation fiber, b) the excitation housings are provided with a translucent housing window, and c) a transverse pump light source is arranged in the region of each translucent housing window such that a pump beam that leaves the pump light source impinges onto the longitudinal axis of the excitation fiber preferably in a perpendicular manner.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 shows a cross-sectional view of the region marked with X in FIG. 1;

FIG. 3 shows a cross-section through the excitation fiber in the region of an excitation chamber;

FIGS. 7a to 7e show different possibilities for distributing an in-coupled beam within a pump cladding.

DESCRIPTION OF THE PREFERRED EMBODIMENT(S)

In describing the preferred embodiment of the present invention, reference will be made herein to FIGS. 1-8 of the drawings in which like numerals refer to like features of the invention.

Figure 1:
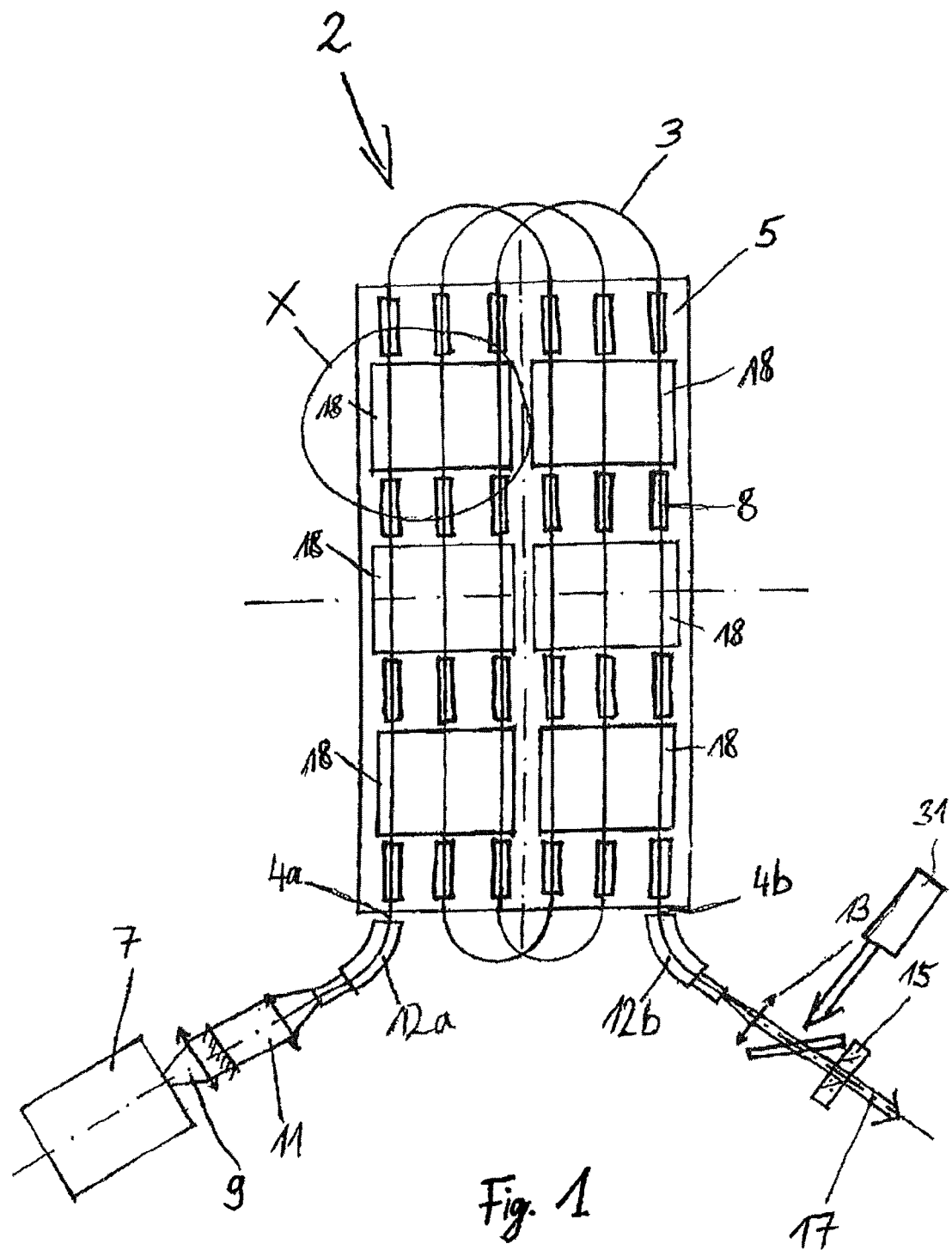
FIG. 1 shows a top view of an embodiment of an excitation unit in accordance with the invention.

FIG. 1 shows a top view of an excitation unit 2 in accordance with the invention. In addition to this excitation unit 2 the fiber laser contains a housing, an energy supply and a cooling system, which are not shown for reasons of clarity.

One can see an active fiber or excitation fiber 3, which in this embodiment is arranged in several loops over a base plate 5.

The excitation fiber 3 has a first fiber end 4a and a second fiber end 4b. "X" marks a region of an excitation housing 18, which will be explained in more detail in connection with FIG. 2.

A longitudinal pump light source 7 is shown which, for example, can be realized in the form of a diode laser and emits a longitudinal pump beam 9, which is coupled into the excitation fiber 3 in the region of the first fiber end 4a via an input collimator 11 and a curved plug connector 12a. In addition, a seed laser can be provided in the region of the pump light source 7 which is arranged perpendicularly to the pump light source 7 and which couples its light in via a partially transparent mirror. The optional seed laser 31 can also be provided in the region of an output beam 17 of the fiber laser, as shown in FIG. 1. Both seed lasers, in the region of the first and second fiber ends 4a, 4b, are optional and need not necessarily be present.

Starting out from the pump light source 7, the light is transported within the excitation fiber 3 which, as shown, is for example arranged in 3 U-formed loops over the base plate 5. The straight-lined regions of the excitation fiber over the base plate 5 form an arrangement in a plane which lies parallel to the plane of the drawing. By way of example, a total of 6 excitation housings 18 are represented diagrammatically, one of which is explained in more detail in FIG. 2. Before and between the excitation housings 18 is, in each case, a holding unit 8, through which the excitation fiber 3 runs and in which it is held. In FIG. 1 three holding units 8 are shown, in diagrammatic form, between each of the excitation housings 18, wherein these three separate holding units 8 can also be combined into a single holding unit.

In the region of the second fiber end 4b there is a second curved plug connector 12b. The light from the excitation fiber 3 is emitted through this second curved plug connector 12b, an output lens 13 and an out-coupling window 15, from where it can then be passed to a processing unit (not shown).

If one follows the path of the excitation fiber 3 in FIG. 1, it can be seen that, on its way from the first fiber end 4a to second fiber end 4b, the fiber always only runs in curves to the right. It has been discovered that, in multimode fibers, this can impair the beam quality of the emitted laser beam. This phenomenon is referred to by experts in the field as the "whispering gallery" effect and means an undesired, irregular distribution of power across the cross-section of the laser beam. With reference to FIG. 1 this means, in concrete terms, that in a cross-section perpendicular to the plane of the drawing, the laser beam in the fiber at the second fiber end 4b would have a higher power on the right-hand side of the cross-section than on the left-hand side of the cross-section. If the fiber were primarily laid in left-hand curves, or only left-hand curves, the higher power at the second fiber end 4b would be, analogously, on the left-hand side.

In order to counteract this phenomenon, the excitation fiber can be laid in alternating right- and left-hand curves (not shown), whereby there may be straight sections between the individual curves. It is not absolutely essential that each right-hand curve should be followed by a left-hand curve; nor is it necessary for there to be a straight section between two curves in each case. The individual curve sections should be balanced out in terms of number and radius of curvature. This applies both to a two-dimensional arrangement, for example as shown in FIG. 1, and to a three-dimensional arrangement of the excitation fiber (not shown).

FIG. 2 shows the region X from FIG. 1 as a sectional view through the excitation housing 18, perpendicular to the longitudinal fiber axis 6. The excitation housing 18 sits on the base plate 5 and essentially consists of two housing sections 18a, 18b, which are connected together in a gas-tight manner. These two housing sections 18a, 18b form an excitation chamber 22 with elliptically formed inner surfaces. These elliptically formed surfaces are reflective and preferably metalized. A housing window 19 is fitted into an opening in the upper housing section 18a, as seen in FIG. 2. Through this housing window 19, a transverse pump beam 25 passes from a transverse pump light source 30 into the excitation chamber 22 and strikes the excitation fiber 3. The pump beam 25 is focused by means of a focusing lens 26. The focusing lens 26 is preferably adjustable and can be attached to the excitation housing. In an embodiment which is not shown it is also possible to arrange the elements 26, 30, 31 and 33 underneath the base plate 5 and allow the transverse pump beam 25 to enter the excitation chamber 22 through corresponding bores in the base plate 5 and the lower housing section 18b. It is also possible to design the transverse pump light source 30 so as to be adjustable.

In addition to the transverse pump light source 30, a seed laser 31 is shown which, in order to achieve the aforementioned advantages, can also be used in the region of the transverse in-coupling, but is not essential. Illustrated diagrammatically with the reference number 33 is a partially transparent mirror. The pump light source 30 and the seed laser 31 emit light with different wavelengths.

As shown in FIG. 2, the elliptically formed surfaces create several focal lines, in this case three. The excitation fiber 3 is passed through the excitation chamber in such a way that the longitudinal fiber axis 6 of the individual sections of the excitation fiber 3 in each case coincides with one of the three focal lines of the excitation chamber 22. The focal line of the focusing lens 26 coincides with the longitudinal fiber axis 6 of the section of the excitation fiber 3 shown in the center in FIG. 2.

FIG. 3 shows a cross-section through the excitation fiber 3. The reference number 3a identifies an active core of the fiber, 3b identifies a pump cladding, 3c identifies a quartz glass cladding and 3d identifies a silicon buffer, as is adequately familiar to specialists in this field 3e identifies, generally, a cover, which in most cases can consist of a plastics material such as PA or nylon. This cover 3e can in turn consist of several layers, though this is not of essential importance to the invention and is therefore not explained in greater detail.

The sections of the excitation fiber 3 which are each located in the interior of the housing sections 18a, 18b are stripped, i.e. both the cover 3e and the silicon buffer 3d have been removed over a certain length. According to this embodiment, the excitation fiber 3 runs three times through each excitation chamber 22, so that, as shown by way of example in FIG. 2, a total of 3×6=18 partial sections of the excitation fiber 3 are stripped.

In the top view as shown in FIG. 1, these 18 stripped partial sections lie within the excitation housing 18. Between adjacent excitation housings 18, i.e. in the region of the holding unit(s) 8, the fiber is not stripped, that is to say it remains completely intact, including its cover 3e. Optionally, the excitation fiber 3 can also be stripped in the region of the holding units 8.

Figure 4:
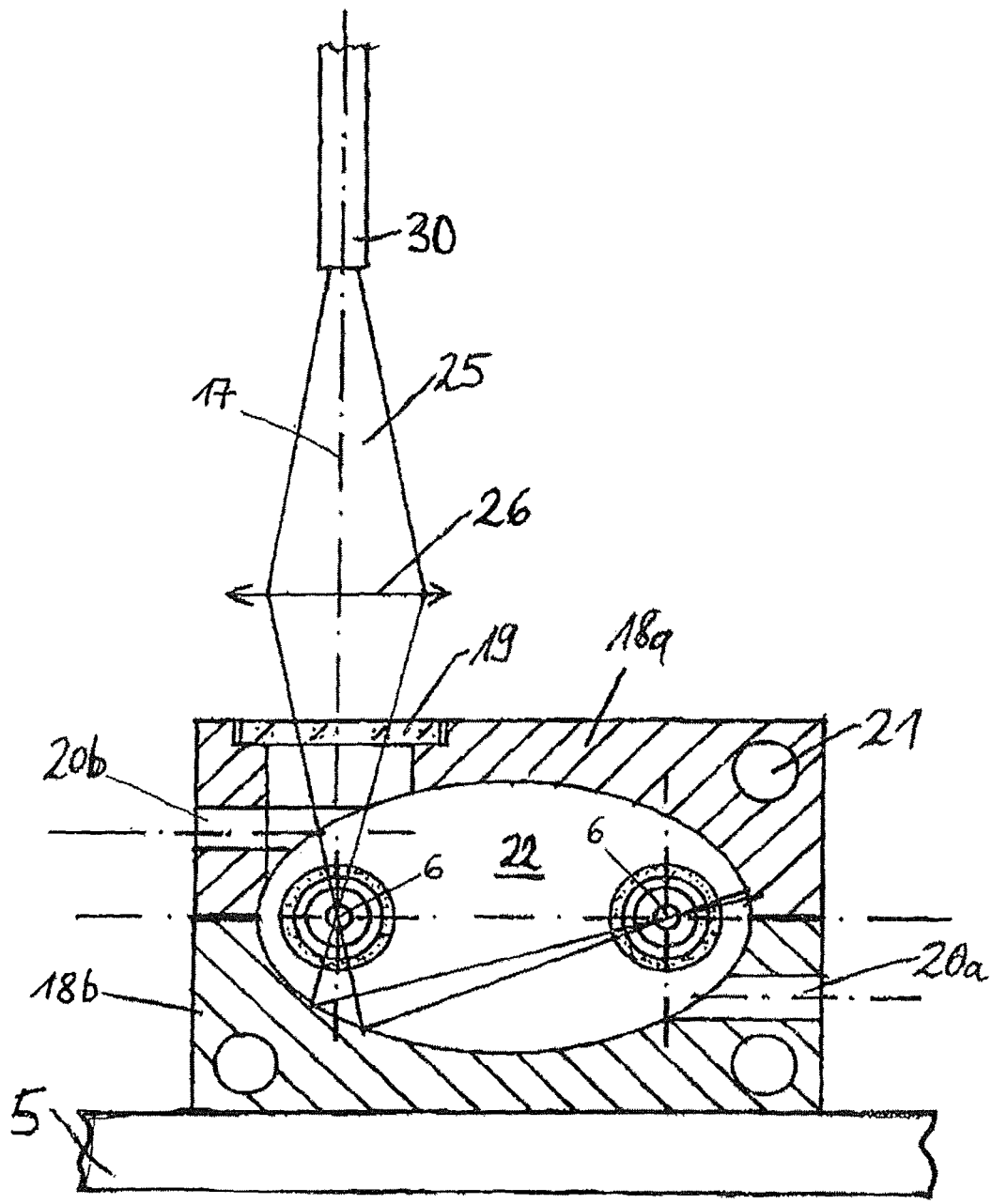
FIG. 4 shows a variation of an excitation chamber.

A second embodiment of an excitation housing 18 for the excitation unit 2 in accordance with the invention is shown in FIG. 4. The difference in comparison with the embodiment as shown in FIG. 2 is that the excitation fiber 3 only passes through each excitation chamber 22 twice. Here too, the inner surfaces of the two housing sections 18a, 18b are elliptical in form and create two focal lines. The longitudinal fiber axis 6 of the excitation fiber is arranged in these focal lines.

In addition, a gas inlet 20a and a gas outlet 20b are shown through which an active, direct gas cooling is realized. A gas, in particular a cooling gas, can be introduced/extracted through these ports 20a, 20b. The reference number 21 indicates cooling bores in the housing sections 18a, 18b; the housing sections are preferably flushed through with cooling water, realizing a passive water cooling.

The transverse pump light source 30 emits a transverse pump beam 25 which is focused by means of the focusing lens 26 such that the focal line of the focused transverse pump beam 25 coincides with the longitudinal axis of the section of the excitation fiber 3 located on the left in the excitation chamber 22.

Figure 5:
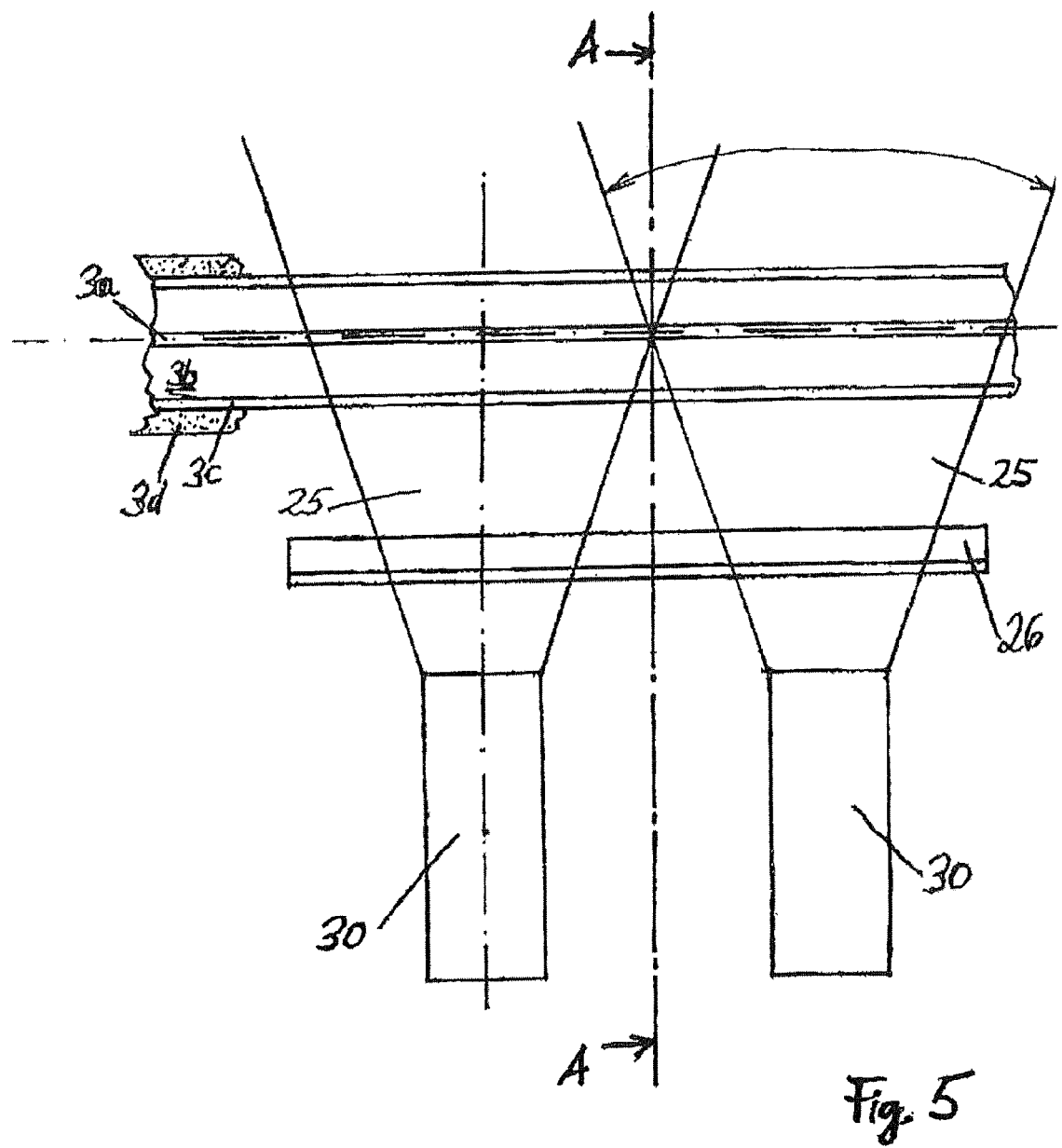
FIG. 5 shows a top view of a section of the excitation fiber with two exemplary transverse pump light sources.

FIG. 5 explains the spatial arrangement of the pump light sources 30 more precisely: these can be in the form of so-called laser bars, which are adequately familiar to specialists in this field. Laser bars are generally bar-formed and consist of a plurality of parallel and adjacent laser diodes which in turn are longitudinal and can have a rectangular cross-section. Laser bars produce a flat, highly divergent laser light, emitted in a slot-like pattern, (see double arrow) which is used in this case as the pump light. The laser light emitted from the laser bars (see top view in FIG. 4 and sectional view in FIG. 5) is focused via a focusing lens 26 in such a way that the focal lines of the pump light, the longitudinal axes of the excitation fiber 3 and the focal lines of the excitation chambers 22 (not shown here) each coincide.

Figure 6:
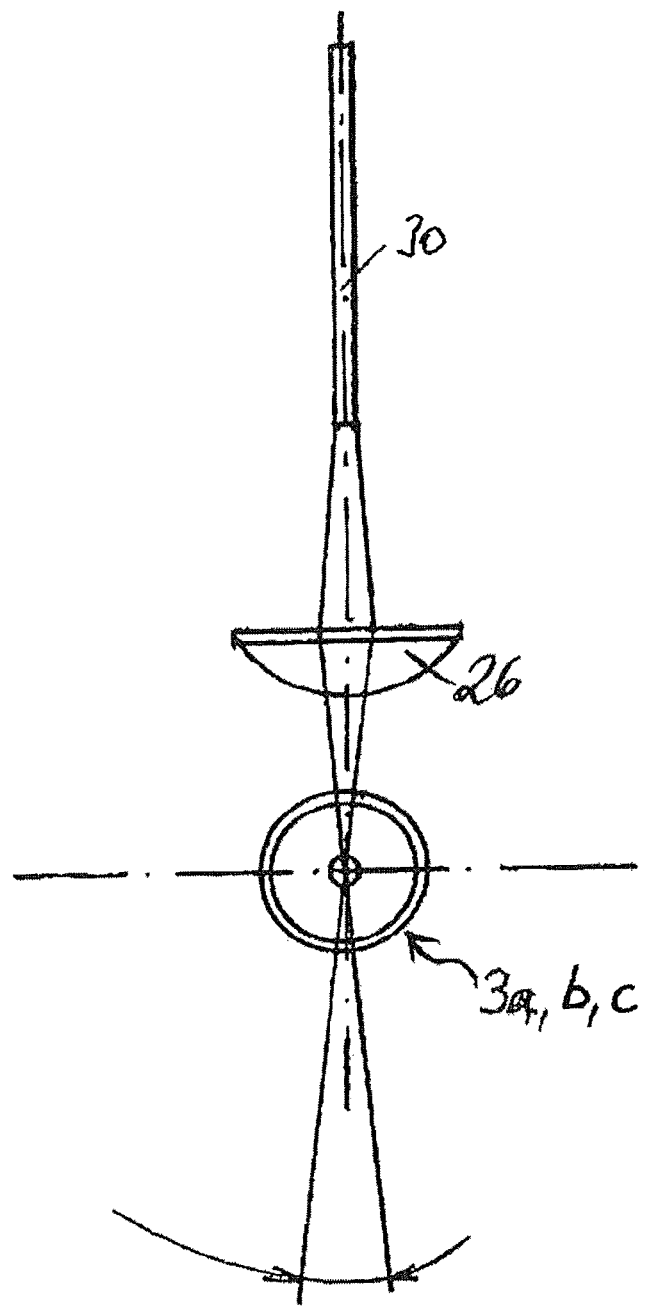
FIG. 6 shows a sectional view along the line A-A in FIG. 5.

The beam characteristics of an exemplary laser bar 30 are shown in FIG. 5 and FIG. 6. In the top view shown in FIG. 5 one can see the relatively pronounced beam divergence, which can amount to up to 30°. FIG. 6 shows, in a side view, a narrower beam divergence in the range up to approx. 8° (see double arrow). The focusing lens 26, which is for example realized in the form of a cylindrical lens, is fixed onto the excitation housing 18 itself by means of mounting fixtures (not shown); these mounting fixtures are preferably adjustable. Preferably, the laser bars or transverse pump light sources 30 are also adjustable. The precise design of the adjustment and attachment of the mounting fixtures for the focusing lens and pump light source are not of key importance to the invention and nor therefore are they described.

FIGS. 7a to 7e show different possibilities of how a perpendicular pump beam can be coupled into the pump cladding. These figures show a portion of an excitation fiber 3 in cross-section, more precisely a stripped excitation fiber 3 with the active core 3a, the pump cladding 3b and the quartz glass cladding 3c. These reference numbers are only used for the FIGS. 7a and 7b, but also apply correspondingly to the other FIGS. 7c to 7e.

FIG. 7a shows in-coupling via a so-called inhomogeneous gradient, FIG. 7b shows in-coupling by diffraction, FIG. 7c shows in-coupling by refraction, FIG. 7d in-coupling by mirror and FIG. 7e in-coupling by total reflection. Such structures are generally created by means of methods for altering the refractive index. FIGS. 7a to 7e show the arrangement of the in-coupling elements or structures in the region of the surface of the pump cladding 3b. It is also possible to arrange these elements or structures in the region of the surface of the active fiber 3a, or also at any points within the volume of the pump cladding 3b or the active fiber 3a.

In all the versions according to the FIGS. 7a to 7e, the in-coupling takes place over a small surface area (for example point-formed or linear focus) and the in-coupled beam is distributed within the pump cladding 3b or the active fiber 3a over a relatively large volume. The energy density is thereby reduced, and reflections from the cladding and fiber are, accordingly, low. Also, the individual rays assume different angles and consequently remain, preferably, within the quartz glass medium.

Figure 8:
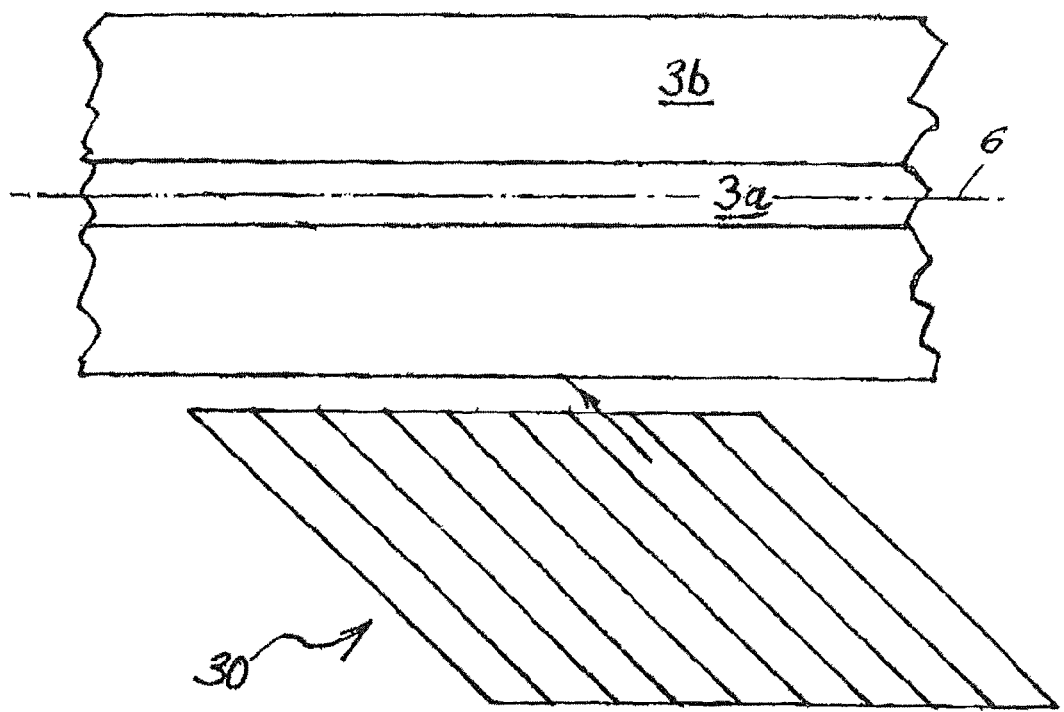
FIG. 8 shows a different spatial arrangement of the pump light source in diagrammatic form.

FIG. 8 shows, in diagrammatic form, a different concept of an excitation unit. Here, a transverse pump light source 30 is shown which is composed of several individual laser diodes which are each arranged at an angle to the longitudinal fiber axis 6 of the excitation fiber. The pump unit is positioned very close to the active medium, and the in-coupling takes place without an intervening focusing lens. Only the active core 3a and the pump cladding 3b of the excitation fiber are shown. A single light ray is shown, diagrammatically, which strikes the surface of the pump cladding obliquely. The radius of the pump cladding is used to focus the pump beam.

The fiber laser in accordance with the invention makes possible a parallel, simultaneous pumping of the excitation fiber taking place over a long section of the excitation fiber in order to allow the fastest possible laser beam generation effect to be achieved. A mode coupling to the short-pulse laser can be achieved through precise spatial positioning and through an arrangement of minors and lenses in the region of the fiber ends 4a, 4b. This allows a narrowing and stabilization of the bandwidth of the wavelength. Also advantageous is the inscription of changes in the refractive index on the surface of the pump cladding and on the surface of the active medium and within the two volumes of these elements, because this allows a deflection of the pump beam into the angle of acceptance of the excitation fiber or of the active medium.

In this invention, an apparatus is claimed which makes possible a simple and economical excitation of so-called multimode fibers. Multimode fibers are active fibers, more precisely fiber cores, which have a diameter of 20 μm to 500 μm and above. In contrast, in the prior art single-mode fibers have principally been used as active fibers; for physical reasons these can only have a maximum diameter within the range only approx. 4 to 20 μm. In view of the much increased volume of the active medium (of the fiber core) it is clear that the fibers in accordance with the invention can have a significantly higher power output than those previously used. In addition, such large core diameters have the advantage that, with transverse excitation, their efficiency is very high because the wave fronts of the pump light fall completely within the volume of the fiber core.

It should be noted that aspects of the invention which are described in relation to one embodiment can also be contained in another embodiment, even if they are not specifically described in relation to this. In other words, all embodiments and/or features of any embodiment can be combined together as desired.

| List of reference numbers | |
| --- | --- |
| 1 | fiber laser |
| 2 | excitation unit |
| 3 | excitation fiber |
| 3a | active core |
| 3b | pump cladding |
| 3c | quartz glass cladding |
| 3d | silicon buffer |
| 3e | cover |
| 4a | first fiber end |
| 4b | second fiber end |
| 5 | base plate |
| 6 | longitudinal fiber axis |
| 7 | longitudinal pump light source |
| 8 | holding unit |
| 9 | longitudinal pump beam |
| 11 | Input collimator |
| 12a | curved plug connector |
| 12b | curved plug connector |
| 13 | output lens |
| 15 | out-coupling window |
| 17 | output beam |
| 18 | excitation housing |
| 18a | housing section |
| 18b | housing section |
| 19 | housing window |

-continued

| List of reference numbers | |
|---|---|
| 20a | gas inlet |
| 20b | gas outlet |
| 21 | cooling channel |
| 22 | excitation chamber |
| 25 | transverse pump beam |
| 26 | focusing lens |
| 30 | transverse pump light source |
| 31 | seed laser |
| 33 | partially transparent mirror |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. An excitation unit for a fiber laser, said excitation unit comprising:
   at least one excitation fiber which has a longitudinal axis and which forms a two-dimensional or three-dimensional structure in a resonator region of the fiber laser, the excitation fiber, when viewed in cross-section, including an active fiber core, a pump cladding that surrounds the active core, a quartz glass casing that surrounds the pump cladding, a silicon buffer that surrounds the quartz glass casing and a cover; and
   the resonator region being equipped with a base plate on which a plurality of excitation housings are provided, each forming a gas-tight excitation chamber, the excitation fiber running through each excitation chamber at least once and being held in holding units laterally to each excitation chamber when viewed in the longitudinal axis of the excitation fiber, the cover of the excitation fiber being removed in the excitation chambers and being completely present in the regions of the holding units, the excitation fiber having a first fiber end which serves as a reflector element, and a second fiber end which serves as an out-coupling mirror element, wherein
   a) the excitation chambers are elliptically formed in a cross-section perpendicular to the longitudinal axis of the excitation fiber,
   b) the excitation housings are provided with a translucent housing window, and
   c) a transverse pump light source is arranged in the region of each translucent housing window such that a pump beam that leaves the pump light source impinges onto the longitudinal axis of the excitation fiber preferably in a perpendicular manner.

2. The excitation unit of claim 1, wherein the excitation fiber runs through each excitation chamber at least two times.

3. The excitation unit of claim 1, wherein the excitation chambers include a gas flushed therethrough.

4. The excitation unit of claim 1, wherein the excitation housings include a cooling medium flushed therethrough.

5. The excitation unit of claim 4, wherein the excitation housings include two housing sections.

6. The excitation unit of claim 3, wherein said elliptically formed excitation chambers include elliptical curved surfaces having focal lines.

7. The excitation unit of claim 6, wherein the focal lines of the elliptical curved surfaces run parallel to one another.

8. The excitation unit of claim 7, wherein the longitudinal axis of the excitation fiber within the excitation chambers coincide with the focal lines of the elliptical curved surfaces.

9. The excitation unit of claim 1 including a focusing lens provided between the transverse pump light source and the excitation fiber.

10. The excitation unit of claim 9 wherein the focusing lens or the transverse pump light source or both is adjustable.

11. The excitation unit of claim 1, wherein the transverse pump light source comprises laser bars, laser diodes, diode lasers, other laser light sources, seed lasers, or laser stacks, or any combination thereof.

12. The excitation unit of claim 1, including several excitation housings combined to form a larger continuous excitation housing.

13. The excitation unit of claim 1 including an in-coupling unit on the first fiber end of the excitation fiber and an out-coupling unit on the second fiber end of the excitation fiber.

14. The excitation unit of claim 13, including a longitudinal pump light source or a seed laser or both are provided in the region of the first fiber end or in the region of the second fiber end or in both regions of the first fiber end and the second fiber end.

15. The excitation unit of claim 14, wherein the longitudinal pump light source comprises laser bars, laser diodes, diode lasers, other laser light sources, or seed lasers, or any combination thereof.

16. The excitation unit of claim 1, wherein the excitation fiber is arranged with opposing directions of curvature.

17. The excitation unit of claim 1 including the transverse pump beam being coupled into the pump cladding of the excitation fiber over a small surface area.

18. The excitation unit according to claim 17, including the transverse pump beam being coupled into the pump cladding of the excitation fiber by an inhomogeneous gradient, diffraction, refraction, mirrors, or total reflection.

19. A fiber laser including an excitation unit, said excitation unit comprising:
   at least one excitation fiber which has a longitudinal axis and which forms a two-dimensional or three-dimensional structure in a resonator region of the fiber laser, the excitation fiber, when viewed in cross-section, including an active fiber core, a pump cladding that surrounds the active core, a quartz glass casing that surrounds the pump cladding, a silicon buffer that surrounds the quartz glass casing and a cover; and
   the resonator region being equipped with a base plate on which a plurality of excitation housings are provided, each forming a gas-tight excitation chamber, the excitation fiber running through each excitation chamber at least once and being held in holding units laterally to each excitation chamber when viewed in the longitudinal axis of the excitation fiber, the cover of the excitation fiber being removed in the excitation chambers and being completely present in the regions of the holding units, the excitation fiber having a first fiber end which serves as a reflector element, and a second fiber end which serves as an out-coupling mirror element, wherein
   a) the excitation chambers are elliptically foamed in a cross-section perpendicular to the longitudinal axis of the excitation fiber,
   b) the excitation housings are provided with a translucent housing window, and c) a transverse pump light source is arranged in the region of each translucent housing window such that a pump beam that leaves the pump light source impinges onto the longitudinal axis of the excitation fiber preferably in a perpendicular manner.

20. The excitation unit of claim 8 including a focusing lens provided between the transverse pump light source and the excitation fiber.

21. The excitation unit of claim 8 including an in-coupling unit on the first fiber end of the excitation fiber and an out-coupling unit on the second fiber end of the excitation fiber.

22. The excitation unit of claim 9 including an in-coupling unit on the first fiber end of the excitation fiber and an out-coupling unit on the second fiber end of the excitation fiber.

23. The excitation unit of claim 8, wherein the excitation fiber is arranged with opposing directions of curvature.

24. The excitation unit of claim 17 wherein the transverse pump beam being coupled into the pump cladding of the excitation fiber over the small surface area with a point form or linear focus.

25. The excitation unit of claim 9 including the transverse pump beam being coupled into the pump cladding of the excitation fiber over a small surface area.

26. The excitation unit according to claim 24, including the transverse pump beam being coupled into the pump cladding of the excitation fiber by an inhomogeneous gradient, diffraction, refraction, mirrors, or total reflection.

\* \* \* \* \*